Patented Aug. 23, 1932

1,872,891

UNITED STATES PATENT OFFICE

JOHN W. CHURCH, OF ROSSLYN FARMS, PENNSYLVANIA, AND HARVEY G. ELLEDGE, OF PAINESVILLE, OHIO, ASSIGNORS TO PURE CALCIUM PRODUCTS COMPANY, OF PITTSBURGH, PENNSYLVANIA, A CORPORATION OF OHIO

PROCESS OF MAKING PRECIPITATED CALCIUM CARBONATE

No Drawing.   Application filed December 24, 1928.   Serial No. 328,308.

This invention relates to a process of making precipitated calcium carbonate (whiting) which is particularly adapted for use as a filler for plastics such as rubber, linseed oil paint, water paint, putty, and phenolic condensation products.

Finely divided calcium carbonate has been used for a long time under the name of "whiting" as a filler in plastics. The most important source of whiting is deposits of chalk in England and on the European Continent. These chalk deposits were supposedly formed by the deposition of great numbers of shells of microscopic organisms. The chalk therefore is a very loosely coherent mass of these tiny shells and is easily broken up into very small particle size. Disintegrated chalk has been referred to as amorphous, but the examination of minute particles of chalk under the ultra-microscope using polarized light shows the unmistakable crystalline structure of calcium carbonate.

It has been supposed that this so-called amorphous structure was responsible for all of the desirable properties of chalk in the various plastic arts. It has been definitely proven however, not only that the chalk is not amorphous, but that one of the principal factors responsible for its desirable properties is the smallness of its particles. This fact, together with the fact that the adsorptive characteristics of disintegrated chalk are low, has caused it to be used to a very large extent in the plastic arts.

Various attempts have been made heretofore to duplicate chalk whiting but they have resulted in little success. It has been attempted to grind limestone but these attempts have failed because it is not possible by any method known to the art of grinding to break up limestone into particles quite as small as that of the chalk. It was known that precipitation, when properly controlled, would yield particle sizes even smaller than those of the chalk, but precipitated whiting would not fill the same need nor take the place of chalk because the surface conditions on the particles of the precipitated whiting were different from the surface conditions on the particles of ground chalk. These different surface conditions, which are indicated by oil adsorption values which differ from the oil adsorption values of ground chalk, are responsible for a peculiar dryness of the precipitated whiting as compared with chalk. Stated differently, it takes about twice as much linseed oil to make a putty from a given amount of the usual precipitated whiting as it takes to produce a putty from an equal weight of ground chalk. Strangely enough, this same difference in surface condition causes a lack of firmness in the bond between precipitated calcium carbonate or whiting and the bonding material such as oil or rubber. This results in a "short" putty, or a "short" stiff, rubber stock which is very difficult to calender.

Our invention provides a process whereby the surface conditions of the particles of precipitated whiting are changed as indicated by the lowering of the oil adsorption number, to give a product which while having the advantage of even smaller particle size than ground chalk, possesses the other physical properties which render the chalk so desirable.

It has been assumed until recently that the quantity of oil adsorbed by a given weight of powder is inversely proportional to the particle size of the powder. In other words, the finer the particles in a given weight of material of the same chemical analysis, the larger the surface area of the mass, and the greater the amount of oil adsorbed on the surface of the particles. This assumption is true provided all other conditions are the same. It has been found however that two powders of identical chemical analysis and of identical particle size, one having been reduced to its size from a large mass by grinding, and the other having been brought to its particle size by precipitation, have entirely different adsorptive properties. The two powders may vary in oil adsorptive value by as much as 200% from each other. For example, two calcium carbonate powders, one ground to 5 microns diameter and the other precipitated to 5 microns diameter, show oil adsorption values of 22 cc. per 100 grams powder for the former, and 44 cc. per 100 grams of the powder for the latter. It will therefore be evident that the surface conditions of powders having the same chemical analysis and the same particle size may differ, as indicated by their oil adsorption values, because of different methods of producing them.

One source of precipitated whiting is the material resulting from the production of sodium hydroxide in an alkali plant by reaction between sodium carbonate and calcium hydroxide. The material resulting from this reaction contains both precipitated calcium carbonate and sodium hydroxide. The precipitated calcium carbonate may be treated in accordance with our invention to adapt it for use as a filler for plastics. Precipitated calcium carbonate after it has been freed from impurities has an oil adsorption value of about 44 cc. per 100 grams of the powder. Ground chalk commonly used in the plastic arts has an oil adsorption value of about 22 cc. per 100 grams of powder. By our invention the surface conditions of the particles of precipitated calcium carbonate may be reduced from a value of about 44 cc. to a value of about 22 cc., so that it is adapted for use in the plastic arts.

In accordance with our invention the raw slurry or mud resulting from the reaction between sodium carbonate and calcium hydroxide in the alkali plant is first washed to free the calcium carbonate from the sodium hydroxide. This operation is preferably accomplished in a Dorr thickener. Any lime which is contained in the material is treated to change it into calcium carbonate, preferably by bubbling carbon dioxide through the slurry. The calcium carbonate is then filtered and dried. It is preferably dried in a rotary drier at a temperature not exceeding 300° F. If a temperature above 300° F. is employed there is the danger of breaking up the calcium carbonate into lime. The material coming from the rotary drier contains lumps which are next broken up, for example, by employing a roller mill provided with an air separator. This treatment in the roller mill only breaks up the lumps but does not appreciably change the surface condition on the particles.

The finely divided particles coming from the roller mill are then subjected to attrition, for example, in a tube mill or a ball mill. The balls employed in the mill can be pebbles, iron rods, steel slugs, or steel balls, but we prefer to use case-hardened steel balls not exceeding ½ inch in diameter. The time to which the material is subjected to attrition varies within fairly wide limits. For example, if a small amount of material weighing about five pounds is attrited in a small ball mill, the attrition is preferably carried on for about 24 hours. On the other hand, if a large size, continuous mill is employed the attrition can be accomplished in a much shorter time. It should be understood that the attrition does not appreciably affect the sizes of the material particles. If the calcium carbonate particles in the slurry or mud obtained from the alkali plant have a size of about 1 to 5 microns diameter, the final product issuing from the mill in which the attrition is carried out will be of a size of about 1 to 5 microns. It will thus be seen that the various steps of the process do not change the size of the precipitated particles but simply change their surface conditions so that they are better adapted to the processes for which they are to be used. The exact effect on the particles accomplished by the attrition is not definitely known but it is believed that this step changes the surface charges on the particles and thereby affects the surface condition, which is indicated by a change in oil adsorption value.

According to a modified process, the attrition may be carried out when the precipitated material is in a wet condition. In this process the raw slurry or mud containing precipitated calcium carbonate, sodium hydroxide and lime is treated in the same manner as previously described in connection with the main process, in order to wash out the sodium hydroxide and convert the lime into calcium carbonate. The wet calcium carbonate is then subjected to attrition in the manner previously described, after which it is filtered and then dried at a temperature not exceeding 300° F. After drying the lumps are disintegrated, for example in a cage mill, after which the material is bolted or screened to produce the finished product. Whether the attrition is carried out either in the dry or the wet state, the size of the particles need not be appreciably affected, to accomplish the desired result.

Whiting produced in accordance with our process is particularly adapted for use as a rubber filler. It weighs about 40 to 45 pounds per cubic foot. Many of the wearing qualities of rubber when in use are gaged by the ratio of stress to strain. In general, all other conditions being equal, the higher the ratio of stress to strain, the better the resistance of the rubber to abrasion.

Pigments used in rubber are of three types namely, coloring pigments, reinforcing pigments, and filling pigments. Whiting belongs to the class of filling pigments. In this class of pigments, the smaller the particle size of the filler, the higher the ratio of stress to strain. Since our whiting is precipitated to a smaller particle size than chalk whiting can be ground economically, it gives a higher ratio of stress to strain than an equal amount of ground chalk when used in equal proportion. However, if it were attempted to use ordinary precipitated whiting as a filter for rubber, without treatment to change its surface conditions, the rubber would not have as great resistance to abrasion as another rubber having the same proportion of ground chalk. The reason for this condition is that precipitated whiting which has not been treated to change the surface condition of the particles does not have as good dispersion characteristics as ground chalk. For this reason precipitated whiting, without further treatment to change its surface condition, is not as acceptacle for certain rubber uses as ground chalk.

However, by changing the surface condition of precipitated calcium carbonate particles so that its oil adsorption value is as low as that of ordinary ground chalk, a product which is superior to ground chalk is obtained. This is due to the fact that although the surface conditions of the precipitated whiting and the ground chalk are the same, the precipitated whiting particles are smaller than the particles of the ground material and therefore gives a greater stress strain ratio and greater resistance to abrasion when used in rubber than does ordinary ground whiting.

We have described in detail two present preferred methods of carrying out our invention. It is to be understood however that the invention is not so limited but may be otherwise embodied or practiced within the scope of the following claims.

We claim:

1. The process of making a filler for plastics, comprising precipitating finely divided calcium carbonate, and subjecting it to prolonged attrition for a time sufficient to reduce its oil adsorption value to below 25 cc. per 100 grams of the calcium carbonate.

2. The process of making a filler for plastics, comprising precipitating finely divided calcium carbonate, and subjecting it to prolonged attrition for a time sufficient to reduce its oil adsorption to approximately that of naturally occurring ground chalk.

3. The process of making a filler for plastics, comprising precipitating finely divided calcium carbonate, and subjecting it to prolonged attrition for a time sufficient to reduce its oil adsorption approximately one-half.

In testimony whereof we have hereunto set our hands.

JOHN W. CHURCH.
HARVEY G. ELLEDGE.